US012686627B2

(12) United States Patent
Kong et al.

(10) Patent No.: US 12,686,627 B2
(45) Date of Patent: Jul. 21, 2026

(54) PREPARATION DEVICES FOR MEDIUM BOROSILICATE MEDICINAL GLASS TUBES AND METHODS THEREOF

(71) Applicant: CAIHONG DISPLAY DEVICES CO., LTD., Xianyang (CN)

(72) Inventors: Lingxin Kong, Xianyang (CN); Lihua Xu, Xianyang (CN); Longjiang Zhao, Xianyang (CN)

(73) Assignee: CAIHONG DISPLAY DEVICES CO., LTD., Xianyang (CN)

( * ) Notice: Subject to any disclaimer, the term of this patent is extended or adjusted under 35 U.S.C. 154(b) by 0 days.

(21) Appl. No.: 18/970,820

(22) Filed: Dec. 5, 2024

(65) Prior Publication Data

US 2025/0100919 A1     Mar. 27, 2025

Related U.S. Application Data

(63) Continuation-in-part of application No. PCT/CN2024/092919, filed on May 13, 2024.

(30) Foreign Application Priority Data

Sep. 4, 2023     (CN) .......................... 202311132462.4

(51) Int. Cl.
*C03B 17/04* (2006.01)
*C03B 5/193* (2006.01)
*C03B 25/02* (2006.01)
(52) U.S. Cl.
CPC ............. *C03B 17/04* (2013.01); *C03B 5/193* (2013.01); *C03B 25/02* (2013.01); *C03B 2201/10* (2013.01)
(58) Field of Classification Search
None
See application file for complete search history.

(56) References Cited

U.S. PATENT DOCUMENTS 1,872,542 A     8/1932  Charles
4,525,194 A  *  6/1985  Rudoi ..................... C03B 17/04
65/195

(Continued)

FOREIGN PATENT DOCUMENTS

CN        2883362 Y      3/2007
CN      201024133 Y      2/2008

(Continued)

OTHER PUBLICATIONS

CN-114105452-A Machine Translation by Clarivate Analytics retrieved Nov. 18, 2025. (Year: 2025).*

(Continued)

*Primary Examiner* — Lisa L Herring
(74) *Attorney, Agent, or Firm* — PORUS IP LLC

(57)     ABSTRACT

Disclosed is a preparation device and a preparation method for a medium borosilicate medicinal glass tube. The preparation device includes a melting system, a forming system and a cutting system. The forming system includes a muffle furnace and a shaping furnace. In an annular seam between a feeder and a guide pipe in the muffle furnace and an inner wall of a furnace channel, the molten glass is pushed downward by gravity of the molten glass and a push pressure of the annular seam and enters the shaping furnace. A pulling tube system is provided with traction rollers and guide clamping rings to clamp and position the molten glass, and the traction rollers clamp the molten glass, so that the molten glass is continuously pulled to form the glass tube under the joint action of the gravity of molten glass and the rotation force of the traction rollers.

16 Claims, 7 Drawing Sheets

(56)        References Cited

U.S. PATENT DOCUMENTS

| 2015/0197442 A1 * | 7/2015 | Bisson | ................... | C03B 17/04 |
| | | | | 65/184 |
| 2017/0203991 A1 | 7/2017 | Berkey et al. | | |
| 2019/0284081 A1 * | 9/2019 | Berkey | ................... | C03B 17/04 |
| 2020/0172423 A1 * | 6/2020 | Berkey | ................ | C03B 9/3672 |

FOREIGN PATENT DOCUMENTS

| CN | 203187529 U | | 9/2013 | | |
| CN | 106495449 A | | 3/2017 | | |
| CN | 108516668 A | | 9/2018 | | |
| CN | 110066100 A | | 7/2019 | | |
| CN | 110255864 A | | 9/2019 | | |
| CN | 114105452 A | * | 3/2022 | ............. | C03B 19/00 |
| CN | 117142750 A | | 12/2023 | | |
| CN | 220951531 U | | 5/2024 | | |
| JP | 2018080065 A | | 5/2018 | | |
| KR | 20040000922 A | | 1/2004 | | |

OTHER PUBLICATIONS

Notification to Grant Patent Right for Invention in Chinese Application No. 202311132462.4 mailed on Apr. 14, 2025, 6 pages.

* cited by examiner

PREPARATION DEVICES FOR MEDIUM BOROSILICATE MEDICINAL GLASS TUBES AND METHODS THEREOF

CROSS-REFERENCE TO RELATED APPLICATIONS

This application is a continuation-in-part application of International Application No. PCT/CN2024/092919, filed on May 13, 2024, which claims priority to Chinese patent application No. 202311132462.4, filed on Sep. 4, 2023, the entire contents of each of which are incorporated herein by reference.

TECHNICAL FIELD

The present disclosure relates to the technical field of medicinal glass tube preparation, and in particular, to a preparation device and a method for a medium borosilicate medicinal glass tube.

BACKGROUND

Pharmaceutical packaging materials, as the direct carrier of pharmaceutical products, have an important responsibility for drug quality and medication safety. Glass has been proved to be the preferred packaging material in the pharmaceutical industry after nearly a hundred years of application and practice due to its characteristics of smooth and transparent, easy disinfection, and good sealing. Especially, medium borosilicate glass has been internationally recognized as the safest pharmaceutical packaging material due to its better impact resistance and chemical stability, which is widely used in pharmaceutical packaging of high-end intravenous solutions, antibiotics, freeze-dried agents, vaccines, biologics, etc.

Medium borosilicate medicinal glass tubes are prepared by secondary processing of medium borosilicate glass tube, and medium borosilicate glass tube drawing technology has become a core barrier of medium borosilicate glass vials. At present, the medium borosilicate glass vials are mainly prepared by Danner process and Verneuil process. The Verneuil process has a high requirement for a plant, resulting in high investment and energy consumption, so the Danner process is more widely used. However, a life of a rotary tube in the Danner process restricts the production efficiency of the tube, and regular replacement and maintenance of the rotary tube invariably increase production costs.

SUMMARY

In order to solve problems of frequent replacement of consumables and regular maintenance of a tube drawing equipment used in the production process of preparing medicinal glass tube. The present disclosure provides a preparation device and a method for a medium borosilicate medicinal glass tube.

One or more embodiments of the present disclosure provide the preparation device for the medium borosilicate medicinal glass tube, comprising:

a melting system, wherein the melting system includes a melting zone and a clarification zone disposed in sequence; the melting zone is configured to melt batch material into molten glass and feed the molten glass into the clarification zone, and the clarification zone is configured to perform bubble homogenization and stirring deaeration on the molten glass, and feed the molten glass into a feeder of a forming system through a feed pipe;

the forming system, wherein the forming system includes a muffle furnace, a shaping furnace, and an annealing furnace arranged in sequence; wherein the muffle furnace includes the feeder, a guide pipe is arranged below the feeder, the guide pipe extends to a lower end of the shaping furnace from the muffle furnace, a furnace channel is disposed outside the feeder and the guide pipe inside the muffle furnace, the furnace channel is coaxially with the feeder and the guide pipe to form an annular seam; at least one set of traction rollers and at least one guide clamping ring are provided in the shaping furnace, the at least one set of traction rollers and the at least one guide clamping ring are configured to clamp and position the molten glass, and the at least one set of traction rollers are arranged on a gripping drive bracket, the gripping drive bracket and the at least one guide clamping ring are provided on a wall of the shaping furnace and connected to an external servo motor; and at least one set of traction rollers and at least one guide clamping ring are provided on an upper part of the annealing furnace; and a cutting system, wherein the cutting system is disposed below the forming system, and the cutting system is configured to cut a formed and annealed glass tube according to a preset size.

One or more embodiments of the present disclosure provide a method for preparing a medium borosilicate medicinal glass tube using the above-described preparation device, comprising:

putting the batch material into the melting furnace for high temperature glass melting to obtain a first molten glass, the first molten glass having a melt viscosity within a range of $10^2$ dPa·s-$10^{2.3}$ dPa·s;

feeding the first molten glass to a homogenization tank for glass clarification and deaeration homogenization to obtain a second molten glass, the second molten glass having a clarification homogenization viscosity within a range of $10^{2.5}$ dPa·s-$10^3$ dPa·s;

feeding the second molten glass into the muffle furnace through the feed pipe, waiting for the second molten glass in the feeder to be full, overflowing from a circular top of the feeder at the same time, and along an outer edge of the feeder, the second molten glass flowing uniformly downward through the annular seam formed by the furnace channel and the feeder, the opening diameter of the second molten glass gradually decreasing and the second molten glass entering the shaping furnace; clamping the molten glass by the at least one set of traction rollers and the at least one guide clamping ring, under the uniform tension of the traction rollers and the gravity of the molten glass, drawing the molten glass into a hollow slender glass tube with a uniform thickness along a pulling tube system; the hollow slender glass tube having a forming and drawing viscosity within a range of $10^4$ dPa·s-$10^{4.3}$ dPa·s;

feeding the hollow slender glass tube into the annealing furnace for annealing to relieve stress for the hollow slender glass tube, the hollow slender glass tube having a stress-relief viscosity of not less than $10^9$ dPa·s; and feeding the annealed hollow slender glass tube into the cutting device for cutting according to a preset size and completing inspection and packaging.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, wherein.

Figure 1:
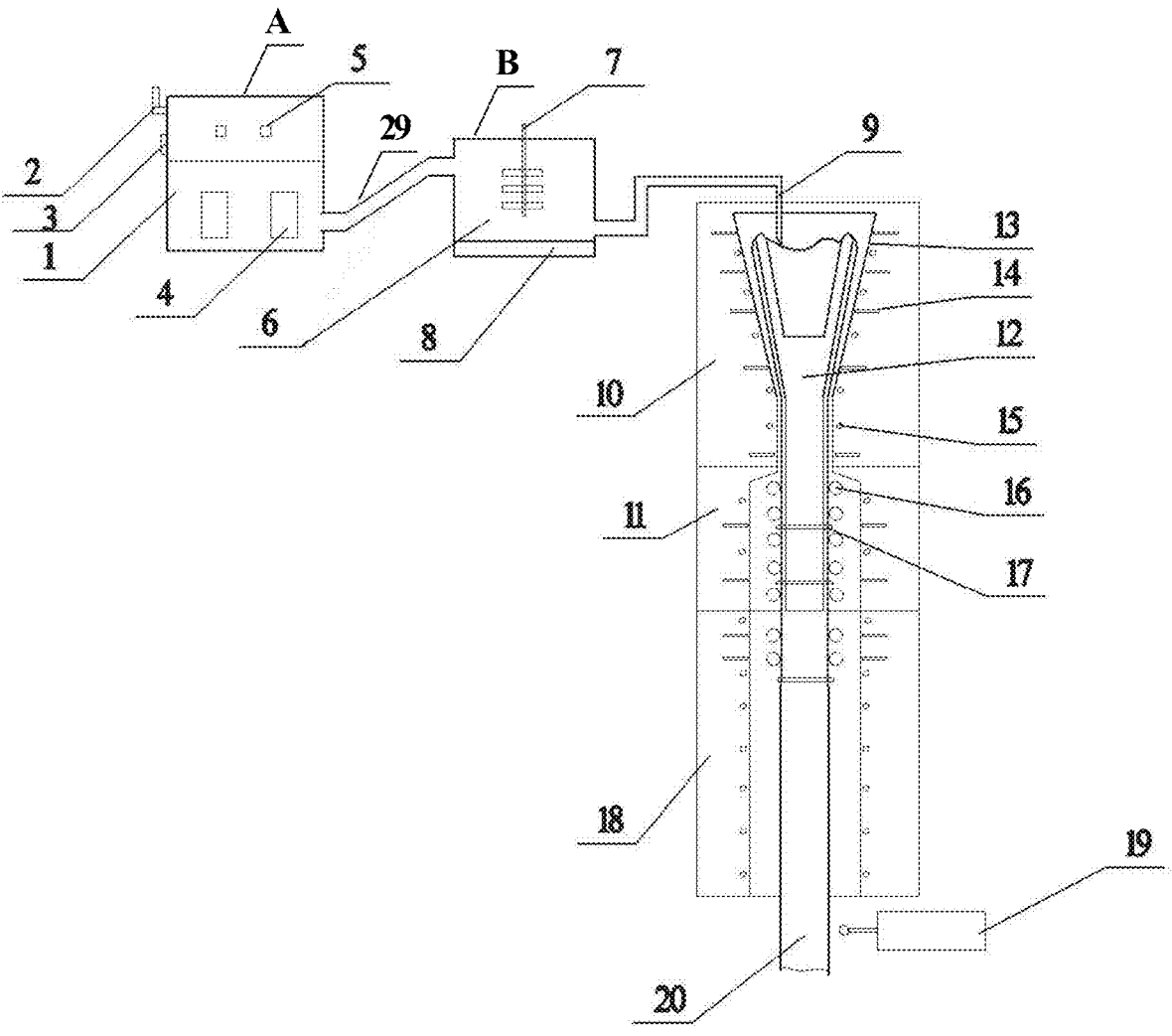
FIG. 1 is a schematic diagram illustrating a structure of a preparation device for a medium borosilicate medicinal glass tube according to some embodiments of the present disclosure.

In the drawings: 1, melting furnace; 2, flue; 3, feeding port; 4, heating electrode; 5, burner; 6, homogenization tank; 7, stirring device; 8, bottom bubbling device; 9, feed pipe; 10, muffle furnace; 11, shaping furnace; 12, feeder; 13, furnace channel; 14, heating device; 15, temperature measuring device; 16, traction roller; 17, guide clamping ring; 18, annealing furnace; 19, online inspection system; 20, glass tube; 21, positioning wheel; 22, gripping drive bracket; 23, monitoring device; 24, automatic adjusting gate; 25, level measuring device; 26, detection device; 27, remote processor; 28, damping device; 29, clarification channel; A, melting zone; B, clarification zone.

DETAILED DESCRIPTION

The present disclosure is further described below in connection with the accompanying drawings.

In order to more clearly illustrate the technical solutions of the embodiments of the present disclosure, the accompanying drawings required to be used in the description of the embodiments are briefly described below. Obviously, the described embodiments are only a portion of embodiments of the present disclosure and not all of the embodiments. According to some embodiments of the present disclosure, all other embodiments obtained by a person of ordinary skill in the art without making creative labor should fall within the scope of protection of the present disclosure.

It should be noted that the terms "first", "second", etc., in the disclosure and claims herein and in the aforementioned drawings are used to distinguish similar objects and not used to describe a particular order or sequence. It should be understood that the data used in this way can be interchanged under appropriate circumstances so that the implementation examples described here can be implemented in the order other than those illustrated or described here. Additionally, the terms "comprising" and "having", and any variations thereof, are intended to cover non-exclusive embodiments. For example, a process, method, system, product, or apparatus that comprises a series of steps or units need not be limited to those that are clearly enumerated, but rather may include other processes, methods, products, or apparatuses not clearly enumerated or inherent to those processes, methods, products, or apparatuses.

The following description of the present disclosure is described in further detail in conjunction with the accompanying drawings:

FIG. 1 is a schematic diagram illustrating a structure of a preparation device for a medium borosilicate medicinal glass tube according to some embodiments of the present disclosure.

As shown in FIG. 1, the present disclosure provides the preparation device for the medium borosilicate medicinal glass tube, including a melting system, a forming system, and a cutting system.

The melting system is configured for glass melting and feeding. The glass melting includes high temperature melting of the batch material, stirring deaeration, and bubble homogenization. The melting system is provided with a melting zone A, a clarification zone B, and a feed pipe 9 in sequence at a horizontal position.

The melting zone A is configured to melt the batch material into molten glass. The batch material may include a combination of crushed glass powder and powder material. The powder material may include quartz sand, limestone, or the like. The melting zone includes a melting furnace 1. The melting furnace is a device used to melt the batch material. The melting furnace 1 is provided with a flue 2, a feeding port 3, heating electrodes 4, burners 5, and a discharge port. The flue 2 is arranged at an upper part of a front wall of the melting furnace 1, and the feeding port 3 is arranged at a lower part of the front wall of the melting furnace 1. The heating electrodes 4 are molybdenum electrodes or tin oxide electrodes, and the heating electrodes 4 are arranged in a stacked configuration along a side of a pool wall. The burners 5 are arranged on both sides of the breastwall of the melting furnace 1. The discharge port is arranged at the bottom of the melting furnace 1 and configured for discharging precipitation impurities of molten glass. The melting furnace 1 adopts all-electric heating or electric-gas heating for the batch material.

The stacked configuration along a side of a pool wall may be understood as mounting the heating electrodes on the side wall of the melting zone in accordance with the side wall mounting manner. The side wall mounting manner refers to firstly fixing a sheath on a side wall of the melting zone, and then connecting the sheath and the heating electrode by threads of the heating electrodes.

The flue refers to a tubular device for discharging exhaust gases and fumes. The feeding port refers to an opening for feeding the batch material. The heating electrode refers to a device for converting electrical energy into thermal energy. The burner refers to a device that generates heat energy by burning fuel and transmits heat energy to the melting furnace.

The clarification zone B includes a clarification channel 29 and a homogenization tank 6. The homogenization tank 6 is provided with a stirring device 7, a bottom bubbling device 8, and an outlet port. One end of the stirring device 7 is vertically connected to a top of the inner space of the homogenization tank, and the other end of the stirring device 7 is suspended in the homogenization tank. The bottom bubbling device 8 is located at the bottom of the homogenization tank at the suspended end of the stirring device 7. The clarification channel 29 connects the melting furnace 1 to the homogenization tank 6. The bottom bubbling device 8 is configured to bubble into the molten glass to enhance convection of molten glass and promote clarification of molten glass. The stirring device 7 is configured to homogenize the molten glass. The outlet port is arranged at a bottom of the homogenization tank 6 and configured for intermittent discharging to discharge the precipitation impurities of the molten glass.

The feed pipe 9 is configured to deliver molten glass to a feeder 12 of the forming system. One end of the feed pipe 9 is connected to a flow channel at a bottom of a side of the clarification zone, and the other end of the feed pipe 9 is placed above the feeder 12. The flow channel refers to a channel flowing out of the molten glass from the clarification zone.

The batch material of crushed glass powder and powder material is fed into the melting furnace 1 through the feeding port 3 and melted into melt at high temperature, first molten glass after complete melting enters the clarification zone through the clarification channel, and second molten glass after clarification and homogenization flows into the feeder 12 of the forming system through the feed pipe 9. The first molten glass refers to molten glass obtained after the high temperature melting treatment of the batch material in the melting furnace. The second molten glass refers to molten glass obtained after clarification and homogenization of the first molten glass.

The forming system includes a muffle furnace 10, a shaping furnace 11, and an annealing furnace 18 arranged vertically from top to bottom. An upper portion of a guide pipe in the muffle furnace 10 is connected to a lower portion of the guide pipe in the shaping furnace 11. The shaping furnace 11 and the annealing furnace 18 are connected to each other by a transfer channel. The transfer channel is used to transport the glass tubes formed in the shaping furnace 11 to the annealing furnace 18.

The muffle furnace is a heating device such as an electric furnace.

The muffle furnace 10 includes the feeder 12, a furnace channel 13, and the upper part of a guide pipe. The feeder 12 is located in the furnace channel 13, and the upper portion of the guide pipe is arranged below the feeder 12. The feeder is a container for placing the second molten glass. The furnace channel is a hollow channel within the muffle furnace. The guide pipe may be used to guide the second molten glass into the shaping furnace 11. The upper portion of the guide pipe refers to a section of the guide pipe located in the muffle furnace.

The feeder 12 is in a shape of an inverted truncated cone, and a depth of the inner barrel of the feeder 12 is not less than ½ of a total height of the feeder 12 and is not greater than the total height of the feeder 12. The guide pipe is cylindrical in shape, and the guide pipe is provided below the feeder 12, and the guide pipe extends from the muffle furnace 10 to a lower end of the shaping furnace 11, and a bottom of the feeder 12 is articulated with an upper end of the guide pipe by a circular arc. The diameter of an upper opening of the furnace channel 13 is larger than the diameter of an upper cross-section of the feeder 12. The furnace channel 13 is coaxially with the feeder 12 and the guide pipe so that the inner wall of the furnace channel 13 forms an annular seam with the feeder 12 and the guide pipe in the muffle furnace 10. The diameter of the part annular seam formed by the inner wall of the furnace channel 13 and the feeder 12 gradually decreases from top to bottom and the diameter of the part annular seam formed by the inner wall of the furnace channel 13 and the guide pipe does not change. The minimum diameter of the furnace channel 13 is 2 mm-30 mm larger than the diameter of the bottom end of the feeder 12.

Figure 2:
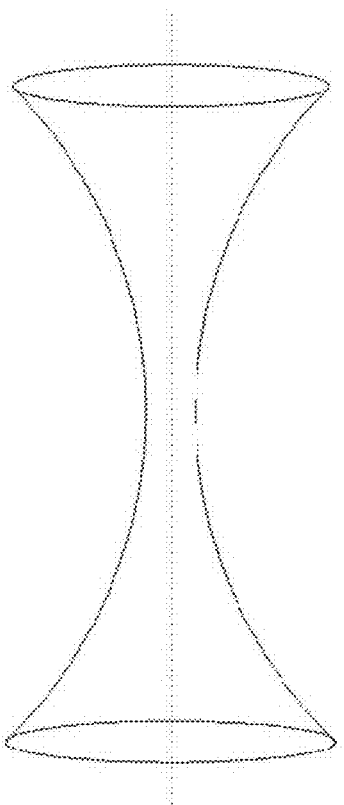
FIG. 2 is a schematic diagram illustrating a structure of a traction roller of a pulling tube system of the preparation device for the medium borosilicate medicinal glass tube according to some embodiments of the present disclosure.

FIG. 2 is a schematic diagram illustrating a structure of a traction roller of a pulling tube system of the preparation device for the medium borosilicate medicinal glass tube according to some embodiments of the present disclosure.

Figure 3:
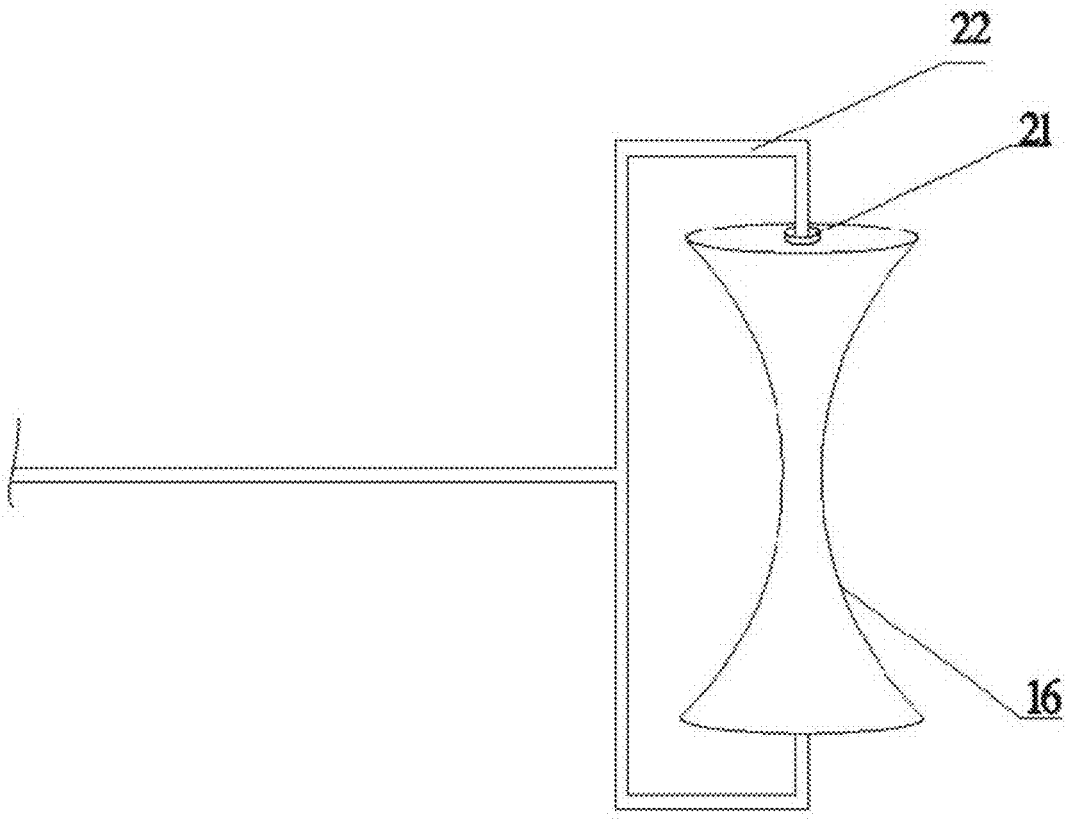
FIG. 3 is a schematic diagram of an installation of the traction roller of the pulling tube system of the preparation device for the medium borosilicate medicinal glass tube according to some embodiments of the present disclosure.

FIG. 3 is a schematic illustration of an installation of the traction roller of the pulling tube system of the preparation device for the medium borosilicate medicinal glass tube according to some embodiments of the present disclosure.

Figure 4:
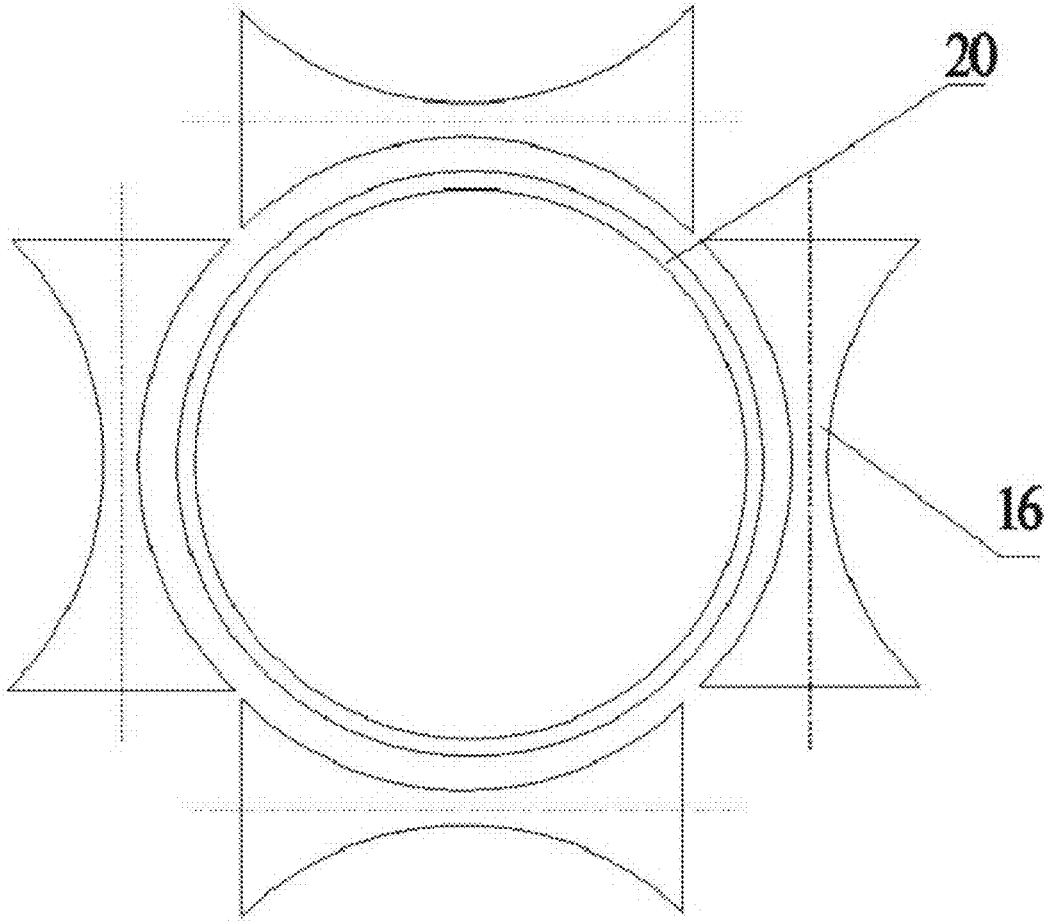
FIG. 4 is a schematic diagram of a layout of the traction rollers of the pulling tube system of the preparation device for the medium borosilicate medicinal glass tube according to some embodiments of the present disclosure.

FIG. 4 is a schematic diagram of a layout of the traction rollers of the pulling tube system of the preparation device for the medium borosilicate medicinal glass tube according to some embodiments of the present disclosure.

Figure 5:
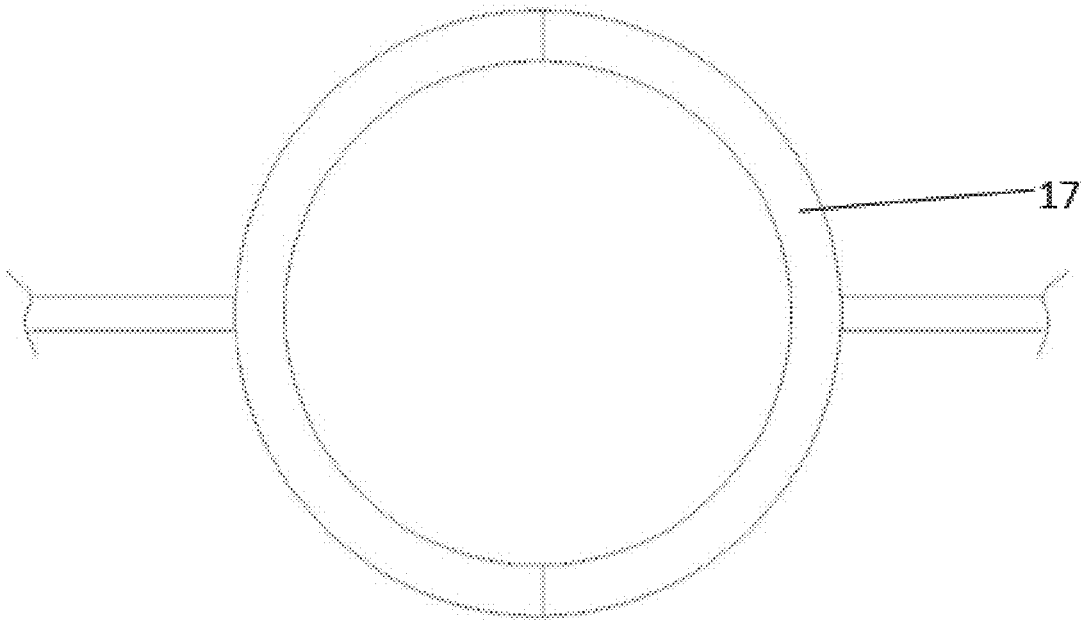
FIG. 5 is a schematic diagram illustrating a structure of a guide clamping ring of the pulling tube system of the preparation device for the medium borosilicate medicinal glass tube according to some embodiments of the present disclosure.

FIG. 5 is a schematic diagram illustrating a structure of a guide clamping ring of the pulling tube system of the preparation device for the medium borosilicate medicinal glass tube according to some embodiments of the present disclosure.

As shown in FIGS. 1-5, the shaping furnace 11 is provided with a pulling tube system. The pulling tube system includes the traction rollers 16, the guide clamping ring 17, a gripping drive bracket 22, and a lower portion of the guide pipe. The traction roller is a mechanical drive. The guide clamping ring may be used to limit or guide a movement direction of the shaft to avoid lateral offset during the movement of the shaft. The gripping drive bracket refers to a bracket used to drive the traction rollers to rotate. The lower portion of the guide pipe refers to a section of the guide pipe located in shaping furnace.

The gripping drive bracket 22 is arranged on the wall of the shaping furnace 11, and the gripping drive bracket 22 is provided with the traction rollers 16, and the traction rollers 16 may rotate on the gripping drive bracket 22. Positioning wheels 21 are arranged at both ends of each traction roller, preventing the traction roller from moving horizontally on the gripping drive bracket 22.

The gripping drive bracket 22 is also connected to a servo motor, and the servo motor controls and drives the traction rollers 16 on the gripping drive bracket 22 to rotate automatically in the flow direction of the molten glass. The sides of the traction rollers 16 are rotational surfaces, and a plurality of traction rollers 16 are one set of traction rollers, which are set at the same horizontal level in the shaping furnace 11, and generatrices of the rotational surfaces of the plurality of traction rollers 16 form an annulus to wrap the glass tube 20.

At least one set of traction rollers 16 grips the molten glass, so that the molten glass is continuously pulled to form the glass tube 20 under the joint action of the gravity of the molten glass and the rotational force of the traction rollers 16. The guide clamping ring 17 is arranged on the wall of the shaping furnace 11 and connected to an external servo motor, which may move according to the actual process needs through the servo motor. The plurality of guide clamping rings 17 are set alternately with the plurality of traction rollers 16 to play a role of guiding and positioning during the pulling process of the molten glass.

In one embodiment, four traction rollers 16, as one set of traction rollers, form an annulus to wrap the glass tube 20.

The at least one set of traction rollers 16 and the guide clamping ring 17 in the annealing furnace 18 are set in the same manner as the at least one set of traction rollers 16 and the guide clamping ring 17 in the shaping furnace 11, and at least one set of traction rollers 16 and the guide clamping ring 17 are centrally set at an upper portion of the annealing furnace 18.

As show in FIG. 1, heating devices 14 are uniformly arranged on the outsides of both the muffle furnace 10 and the shaping furnace 11, which are configured for the heating and insulation of the furnace body. The heating devices 14 are also centrally set at the upper part of the annealing furnace 18, causing that the temperature in the annealing furnace 18 decreases in a gradient manner to relieve the internal stress of the glass, so that the internal structure of the glass tube 20 formed by the pulling tube system is more compact.

The heating devices are heating rods or heating wires wrapped around the outer wall of the furnace. The temperature measuring devices 15 are uniformly arranged on the outsides of the muffle furnace 10 and the shaping furnace 11. The temperature measuring devices 15 are arranged on the outside of the annealing furnace 18 according to the temperature gradient in the annealing furnace. The temperature measuring devices 15 are thermocouples.

In some embodiments, the preparation device further includes an online inspection system 19. The online inspection system 19 is located at an outlet of the annealing furnace 18 and configured to perform real-time monitoring and provide feedback on the glass tube diameter and glass tube condition.

The cutting system is disposed below the forming system, which is configured to cut the glass tube 20 that has been formed and annealed according to a preset size. The cut ports are rounded with round burner flame or sanded flat. The cut glass tube 20 are stacked and stored for packing.

In some embodiments, the preparation device has the following beneficial effects.

(1) The preparation device includes the annular seam set between the feeder and the guide pipe in the muffle furnace and the inner wall of the furnace channel, the molten glass overflowing from the muffle furnace is pushed downward to enter the shaping furnace under own gravity of the molten glass and the push pressure of the annular seam; the pulling tube system of the shaping furnace is provided with the traction rollers and the guide clamping rings to clamp and position the molten glass; the molten glass is continuously pulled to form the glass tube under the joint action of the gravity of the molten glass and the rotational force of the traction rollers; the formed glass tube is fed into the annealing furnace to complete annealing to relieve stress to obtain the prepared glass tube. The whole preparation process of the glass tube is simple, which avoids cumbersome processes, while guaranteeing the quality of inside and outside of the glass tube.

(2) The preparation device has a simple structure and is easy to maintain, and also reduces the cost energy consumption.

(3) The clarification channel is set for a first clarification, and the clarification homogenization tank is provided with a bubbling device for a second clarification, and two clarification stages are set for better clarification of the molten glass.

(4) The sides of the traction rollers set on the preparation device are the rotational surfaces, the rotational surfaces form an annulus to clamp the molten glass, the molten glass is subjected to uniform traction force, ensuring the uniform thickness of the prepared glass tube.

In some embodiments, a method for preparing a medium borosilicate glass tube using the above-described preparation device comprises follow operations.

The batch material is weighed according to a ratio of raw materials, and the batch material is added into a mixer for mixing evenly.

The mixed batch material is melted in the melting furnace 1 by high temperature glass melting to obtain a first molten glass, the first molten glass having a melt viscosity within a range of $10^2$ dPa·s-$10^{2.3}$ dPa·s.

The first molten glass is fed to the homogenization tank 6 for glass clarification and deaeration homogenization to obtain a second molten glass; the second molten glass having a clarification homogenization viscosity within a range of $10^{2.5}$ dPa·s-$10^3$ dPa·s.

The second molten glass is fed into the muffle furnace 10 through the feed pipe 9, waiting for the second molten glass in the feeder 12 to be full, the second molten glass overflows from a circular top of the feeder 12 at the same time, and along an outer edge of the feeder 12, the second molten glass flows uniformly downward through the annular seam formed by the furnace channel and the feeder, along the outside of the feeder 12, the opening diameter of the second molten glass gradually decreases and the second molten glass enters the shaping furnace 11; the molten glass is clamped by the at least one set of traction rollers 16 and the at least one of guide clamping ring 17 of the pulling tube system, under the uniform tension of the traction rollers 16 and the gravity of molten glass, the molten glass is pulled into a hollow slender glass tube with a uniform thickness along the pulling tube system; the hollow slender glass tube having a forming and drawing viscosity within a range of $10^4$ dPa·s-$10^{4.3}$ dPa·s.

The hollow slender glass tube is fed into the annealing furnace 18 for annealing to relieve stress for the hollow slender glass tube, the hollow slender glass tube having a stress-relief viscosity of not less than $10^9$ dPa·s.

The annealed hollow slender glass tube is fed into the cutting device for cutting according to a preset size, and inspection and packaging are completed. After the glass tube is inspected, the glass tube directly enters the secondary processing process of medicinal glass to complete the processing of the medicinal glass bottles such as ampoules, vials, or the like.

Figure 6:
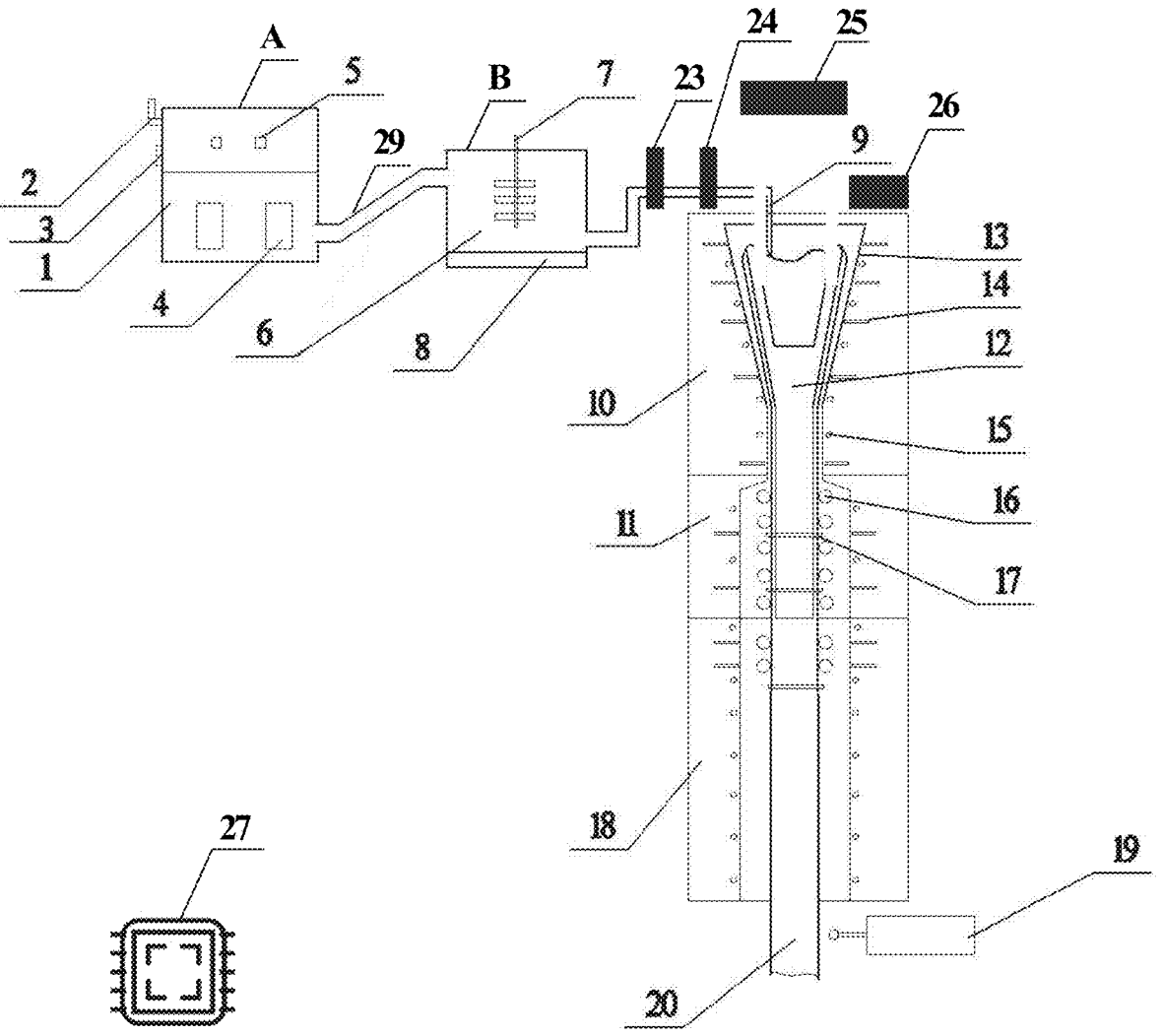
FIG. 6 is a schematic diagram illustrating another structure of the preparation device for the medium borosilicate medicinal glass tube according to some embodiments of the present disclosure.

FIG. 6 is a schematic diagram illustrating another structure of the preparation device for the medium borosilicate medicinal glass tube according to some embodiments of the present disclosure.

In some embodiments, as shown in FIG. 6, the preparation device further includes an automatic adjusting gate 24, a level measuring device 25, a remote processor 27, a monitoring device 23, and a detection device 26.

The automatic adjusting gate 24 is disposed on the feed pipe 9. The automatic adjusting gate 24 is configured to regulate a flow rate of the molten glass fed into the muffle furnace 10 via the feed pipe 9 based on a speed adjustment parameter of the molten glass.

The speed adjustment parameter is a parameter that regulates the flow rate of the molten glass that is fed into the muffle furnace 10 via the feed pipe 9. In some embodiments, the speed adjustment parameter includes an opening diameter of the automatic adjusting gate.

The level measuring device 25 is disposed above the furnace channel 13, and the level measuring device 25 is configured to measure overflow liquid distribution data of the molten glass overflowing from a circular top of the feeder 12. For example, the level measuring device 25 may include an infrared detector, etc.

In some embodiments, the overflow liquid distribution data includes the height of the overflow molten glass at multiple preset points on the annular seam between the feeder 12 and the furnace channel 13. The preset points may be preset by the person skilled in the art based on experience.

The monitoring device 23 is disposed on the feed pipe 9 between the clarification zone and the automatic adjusting gate 24, and the monitoring device 23 is configured to monitor a discharge rate of the clarification zone. The discharge rate is a rate of the second molten glass discharged from the clarification zone. For more description of the second molten glass, please see the description in FIGS. 1-5.

In some embodiments, the monitoring device 23 includes an ultrasonic flow meter, an electromagnetic flow meter, etc.

The detection device 26 is disposed above the furnace channel, and the detection device 26 is configured to detect a molten glass feature at the annular seam. For example, the detection device 26 may include an ultrasonic detector, etc.

The molten glass feature is a feature associated with the molten glass on the annular seam. In some embodiments, the molten glass feature includes a molten glass viscosity.

The remote processor 27 is configured to determine the speed adjustment parameter based on the discharge rate, the molten glass feature, and the overflow liquid distribution data.

In some embodiments, the remote processor is configured to determine a first target feature vector based on the discharge rate, the molten glass feature, and the overflow liquid distribution data; determine a first correlation feature vector via a first vector database based on the first target feature vector; and determine a reference speed adjustment parameter corresponding to the first correlation feature vector as the speed adjustment parameter.

The first vector database includes a plurality of first reference feature vectors, and each of the plurality of first reference feature vectors has a corresponding reference speed adjustment parameter. In some embodiments, the remote processor is configured to construct clustering vector based on historical discharge rate, historical molten glass feature, historical overflow liquid distribution data, and historical speed adjustment parameters of clarification zone corresponding to glass tubes with good production quality in historical data, to form a preset number of clustering centers; construct first reference feature vector based on the historical discharge rate, the historical molten glass feature, and the historical overflow liquid distribution data of the clarification zone corresponding to each of the preset number of clustering centers; and take the historical speed adjustment parameter of the clarification zone corresponding to the clustering center as the reference speed adjustment parameter corresponding to the first reference feature vector.

In some embodiments, the remote processor may determine a glass tube with a forming quality coefficient greater than a coefficient threshold in the historical data as a glass tube with good production quality. The coefficient threshold is a critical value of the forming quality coefficient. The coefficient threshold may be preset by the person skilled in the art based on experience.

The forming quality coefficient is a numerical value used to evaluate the quality of a formed glass tube. The larger the forming quality coefficient, the better the quality of the glass tube.

In some embodiments, the remote processor may determine the forming quality coefficient of the glass tube through the first prediction model. For more description of the first prediction model, please see the description in the relevant section below.

In some implementations, the remote processor may also put a preset number of glass tubes into use, the preset number of glass tubes being produced by the preparation device according to the same historical discharge rate, the same historical molten glass feature, the same historical overflow liquid distribution data, and the same historical speed adjustment parameter; count a number of quality problems of the preset number of glass tubes within a preset time; and based on the number of quality problems, determine the forming quality coefficient of the glass tubes. The quality problems may include problems such as the glass tubes not being heat-resistant, optical performance problem, or fragmentation of glass tubes due to non-human reasons during the shelf life. The preset time and preset number may be preset by the person skilled in the art based on experience. The optical performance problem may include refractive index, transparency, etc. of the glass tubes not meeting preset requirements. The preset requirements may be preset by those skilled in the art based on experience.

In some embodiments, the remote processor may determine the reciprocal of the number of quality problems as the forming quality coefficient of the glass tube.

In some embodiments, the remote processor may determine, based on the first target feature vector, the first reference feature vector that meets the first target preset condition in the first vector database, and determine the first reference feature vector that meets the first target preset condition as the first correlation feature vector. In some embodiments, the first target preset condition may include a vector distance from the first target feature vector being minimum, etc.

In some embodiments, the remote processor may also determine a flow uniformity value of the molten glass based on the overflow liquid distribution data and the molten glass feature; and determine the speed adjustment parameter based on the flow uniformity value and the discharge rate.

The flow uniformity value refers to a value used to measure the uniformity of the height of the overflow molten glass at multiple preset points in the overflow distribution data per unit time. In some embodiments, the larger the flow uniformity value, the more uniform the height of the molten glass of the multiple preset points.

In some embodiments, the remote processor may calculate, based on the overflow liquid distribution data, a variance of the heights of the overflow molten glass at preset points in the overflow liquid distribution data; use the reciprocal of the variance as an initial flow uniformity value of the molten glass; and determine the flow uniformity value of the molten glass based on the initial flow uniformity value of the molten glass and the molten glass viscosity of the molten glass feature.

In some embodiments, since the molten glass viscosity affects the flowability of the molten glass, the remote processor may, in response to the greater the molten glass viscosity in the molten glass feature, reduce the initial flow uniformity value of the molten glass appropriately in accordance with a preset uniformity adjustment amount as the flow uniformity value of the molten glass; conversely, the remote processor may also increase the initial flow uniformity value of the molten glass appropriately in accordance with a preset uniformity adjustment amount as the flow uniformity value of the molten glass. The preset uniformity adjustment amount may be preset for a person skilled in the art based on experience.

In some embodiments, the remote processor obtains a glass tube diameter through an online inspection system; and determines the flow uniformity value of the molten glass by a uniformity value prediction model based on the glass tube diameter, the overflow liquid distribution data, and the molten glass feature.

The glass tube diameter refers to a diameter of the glass tube.

In some embodiments, the uniformity value prediction model is a machine learning model. In some embodiments, the uniformity value prediction model may be a neural network (NN) model or a deep neural network (DNN) model, etc.

In some embodiments, the uniformity value prediction model may be obtained by training based on a plurality of first training samples with first labels.

In some embodiments, each set of first training samples of the first training samples may include a historical sample glass tube diameter, historical sample overflow liquid distribution data, and historical sample molten glass feature, and the first training labels may be actual flow uniformity values of the molten glass obtained based on the first training samples.

In some embodiments, the first training samples may be obtained from historical data.

In some embodiments, the remote processor may calculate a variance of the glass tube thicknesses at a plurality of preset positions on the glass tubes, the glass tubes being produced by the preparation device based on first training samples; take the reciprocal of the variance as the actual flow uniformity value of the molten glass. The plurality of preset positions may be preset by the person skilled in the art based on experience. The glass tube thicknesses at the plurality of preset positions on the glass tubes may be measured by microscopic measurement of section or an ultrasonic thickness gauge.

In some embodiments, the processor may input the historical sample glass tube diameter, the historical sample overflow liquid distribution data, and the historical sample molten glass feature of the first training samples with the first labels into an initial uniformity value prediction model, construct a loss function through the first labels and prediction results of the initial uniformity value prediction model, and update the parameters of the initial uniformity value prediction model iteratively until the loss function converges, a number of iterations reaches a threshold, etc., and stop the training to obtain a trained uniformity value prediction model.

In some embodiments, in response to the flow uniformity value being greater than or equal to a preset threshold and the discharge rate being within a preset speed range, the remote processor determines that the speed adjustment parameter of the molten glass at the current state remains unchanged. If the current state is an initial state, the speed adjustment parameter of the molten glass is a default speed adjustment parameter. The initial state is a state when the speed adjustment parameter of the automatic adjusting gate is set for the first time. The default speed adjustment parameter may be the historical common speed adjustment parameter. If the current state is not the initial state, the remote processor may keep the current set speed adjustment parameter of the molten glass unchanged. The preset threshold is a critical value for the flow uniformity value. The preset threshold and the preset speed range may be preset by the person skilled in the art based on experience.

In some embodiments, in response to the flow uniformity value being greater than or equal to the preset threshold value and the discharge rate being less than the preset speed range, the remote processor may appropriately increase the opening diameter of the automatic adjusting gate according to a first preset magnitude on the basis of the speed adjustment parameter of the molten glass at the current state. The first preset magnitude may be preset by a person skilled in the art based on experience. For example, the more the discharge rate is less than a minimum value of the preset speed range, the larger the first preset magnitude may be preset.

It can be understood that when the flow uniformity value is uniform, but the discharge rate of the outlet port of the clarification zone is too small, under the speed adjustment parameter of the molten glass at the current state, the discharge rate of the outlet port of the clarification zone may cause the flow rate of the molten glass through the automatic adjusting gate to be too small. The remote processor appropriately increases the opening diameter of the automatic adjusting gate, which can ensure that the overflow second molten glass reduces the possibility of nonuniform while maintaining the same current state.

In some embodiments, in response to the flow uniformity value being greater than or equal to the preset threshold and the discharge rate being greater than the preset speed range, the remote processor may appropriately reduce the opening diameter of the automatic adjusting gate according to a second preset magnitude on the basis of the speed adjustment parameter of the molten glass at the current state. The second preset magnitude may be preset by a person skilled in the art based on experience. For example, the more the discharge rate is greater than a maximum value of the preset speed range, the larger the second preset magnitude may be preset.

Understandably, when the flow uniformity value greater than the preset threshold indicates that the flow uniformity value uniform, but the discharge rate of the outlet port of the clarification zone is too large, under the speed adjustment parameter of the molten glass at the current state, the discharge rate of the outlet port of the clarification zone causes the flow rate of the molten glass through the automatic adjusting gate to be too large. On the basis of the speed adjustment parameter of the molten glass at the current state, the remote processor may appropriately reduce the opening diameter of the automatic adjusting gate in accordance with the second preset magnitude, which can ensure that the amount of the overflow molten glass is reduced, the flow speed of the molten glass is reduced, and the possibility of nonuniform is reduced.

In some embodiments, in response to the flow uniformity value being less than the preset threshold and the discharge rate being within the preset speed range, the remote processor may appropriately reduce the opening diameter of the automatic adjusting gate according to a third preset magnitude on the basis of the speed adjustment parameter of the molten glass at the current state. The third preset magnitude may be preset by a person skilled in the art based on experience. For example, the larger the absolute value of the difference between the flow uniformity value and the preset threshold, the larger the third preset magnitude may be preset.

Understandably, when the flow uniformity value is less than the preset threshold, indicating that the flow uniformity value is not uniform, but the discharge rate of the outlet port of the clarification zone is normal, it is indicated that the nonuniform flow uniformity value when discharging from the outlet port of the clarification zone may be caused by the viscosity of the molten glass or other reasons.

The remote processor may appropriately reduce the opening diameter of the automatic adjusting gate to slow down the whole process, making the subsequent overflow molten glass more uniform and reducing the possibility of nonuniform of the molten glass.

In some embodiments, in response to the flow uniformity value being less than the preset threshold and the discharge rate being less than the preset speed range, the remote processor may appropriately increase the opening diameter of the automatic adjusting gate according to a fourth preset magnitude on the basis of the speed adjustment parameter of the molten glass at the current state. The fourth preset magnitude may be preset by a person skilled in the art based on experience. For example, the larger an absolute value of the difference between the discharge rate and the minimum value of the preset speed range, the larger the fourth preset magnitude may be preset.

Understandably, when the flow uniformity value is nonuniform, and the discharge rate of the outlet port of the clarification zone is too small, the remote processor may appropriately increase the opening diameter of the automatic adjusting gate on the basis of the speed adjustment parameter of the molten glass at the current state to slow down the whole process, making the subsequent overflow molten glass more uniform and reducing the possibility of nonuniform of molten glass.

In some embodiments, in response to the flow uniformity value being less than the preset threshold and the discharge rate being greater than the preset speed range, the remote processor may appropriately reduce the opening diameter of the automatic adjusting gate according to a fifth preset magnitude on the basis of the speed adjustment parameter of the molten glass at the current state. The fifth preset magnitude may be preset by a person skilled in the art based on experience. For example, the larger the difference between the discharge rate and the maximum value of the preset speed range, the larger the fifth preset magnitude may be preset.

Understandably, when the flow uniformity value is nonuniform and the discharge rate of the outlet port of the clarification zone is too large, under the speed adjustment parameter of the molten glass at the current state, the discharge rate of the outlet port may cause the flow rate of the molten glass through the automatic adjusting gate to be too large. Therefore, the remote processor may appropriately reduce the opening diameter of the automatic adjusting gate to slow down the whole process, ensuring that the amount of the overflow molten glass is reduced and the possibility of uniformity of molten glass is reduced.

In some embodiments, the remote processor may also determine the speed adjustment parameter using operations k1-k3 as follows.

In k1, determine a flow rate of the molten glass based on the discharge rate.

The flow rate of the molten glass refers to a volume of molten glass passing through a cross-section of the feed pipe per unit time.

In some embodiments, the remote processor may determine the flow rate of the molten glass based on the discharge rate by a first preset comparison table. The first preset comparison table includes a correspondence between a reference discharge rate and a reference molten glass flow rate. The first preset comparison table may be constructed based on priori knowledge or historical data.

For example, because different molten glass has different viscosities, different concentrations, different discharge rate of the clarification zone, and different flow rate of the clarification zone, the correspondence between the reference discharge rate and the reference molten glass flow rate may be related to the composition and ratio of the reference molten glass.

In k2, determine a forming quality coefficient of the glass tube corresponding to a candidate adjustment parameter through a first prediction model based on the candidate adjustment parameter, the flow rate of the molten glass, and the flow uniformity value.

The candidate adjustment parameter refers to the speed adjustment parameter to be determined.

In some embodiments, the remote processor may identify a plurality of historical speed adjustment parameters with a high usage frequency in the historical data as candidate adjustment parameters.

In some embodiments, the first prediction model is a machine learning model. In some embodiments, the first prediction model may be a neural network (NN) model or a deep neural network (DNN) model, etc.

In some embodiments, the first prediction model may be obtained by training based on a plurality of second training samples with second labels.

In some embodiments, each set of the second training samples of the second training samples may include a historical sample adjustment parameter, a historical sample flow rate of the molten glass, and a historical sample flow uniformity value, and the second labels may be actual forming quality coefficients of the formed glass tube after adjustment based on the historical sample adjustment parameter.

In some embodiments, the second training samples may be obtained from the historical data.

In some embodiments, the remote processor may detect at least one indicator of the formed glass tube to obtain indicator detection results; and determine a number of indicators that satisfy the indicator requirement based on the indicator detection results; and take the ratio of the number of indicators to the total number of indicators as an actual forming quality coefficient of the formed glass tube.

The indicator may include at least one of an inner diameter, a thickness of the tube wall, heat resistance, optical property, etc. of the formed glass tube.

The indicator detection results may characterize whether each indicator satisfies the corresponding indicator requirement. For example, the indicator detection results may include detecting whether diameters of multiple positions on the formed glass tube are uniform and qualified, detecting whether the wall thickness of the formed glass tube is uniform, detecting whether the heat resistance of the formed glass tube at a specific temperature meets heat resistance requirement, and detecting whether light transmittance, refractive index, smoothness, and uniformity of the formed glass tube meet specific requirements. The criteria for uniformity and qualification of diameters of multiple positions on the formed glass tube, uniformity of the wall thickness of the formed glass tube, the heat resistance requirement, and the specific requirements may be preset by a person skilled in the art based on experience.

In some embodiments, the training process of the first prediction model by the remote processor is similar to the training process of the uniformity value prediction model, for the specific training process of the first prediction model, please see the previous description of the training process of the uniformity value prediction model.

In k3, determine the speed adjustment parameter based on the forming quality coefficient.

In some embodiments, the remote processor may select the candidate adjustment parameter with the highest forming quality coefficient as the speed adjustment parameter.

In some embodiments, the automatic adjusting gate is disposed on the feed pipe for adjusting the flow speed of the molten glass, and the level measuring device is disposed above the furnace channel to measure the overflow liquid distribution data of the overflowed molten glass; the flow uniformity value of the molten glass is determined according to the overflow liquid distribution data of the molten glass; and the opening diameter of the automatic adjusting gate is adjusted to control the uniform flow of the molten glass according to the flow uniformity value of the molten glass. The preparation device may control the flow speed of the molten glass flowing into the feeder, so as to avoid the fluctuation in the flow speed of the molten glass flowing into the feeder, which leads to the fluctuation in the speed of the molten glass overflowing above the feeder, further leading to the nonuniform molten glass flowing into the annular seam, thus affecting the forming quality of the glass tube.

In addition, the remote processor predicts the forming quality coefficients of the candidate adjustment parameters through the first prediction model, and then selects the candidate adjustment parameter with the largest forming quality coefficient as the speed adjustment parameter, which can improve the accuracy of the final speed adjustment parameter.

Figure 7:
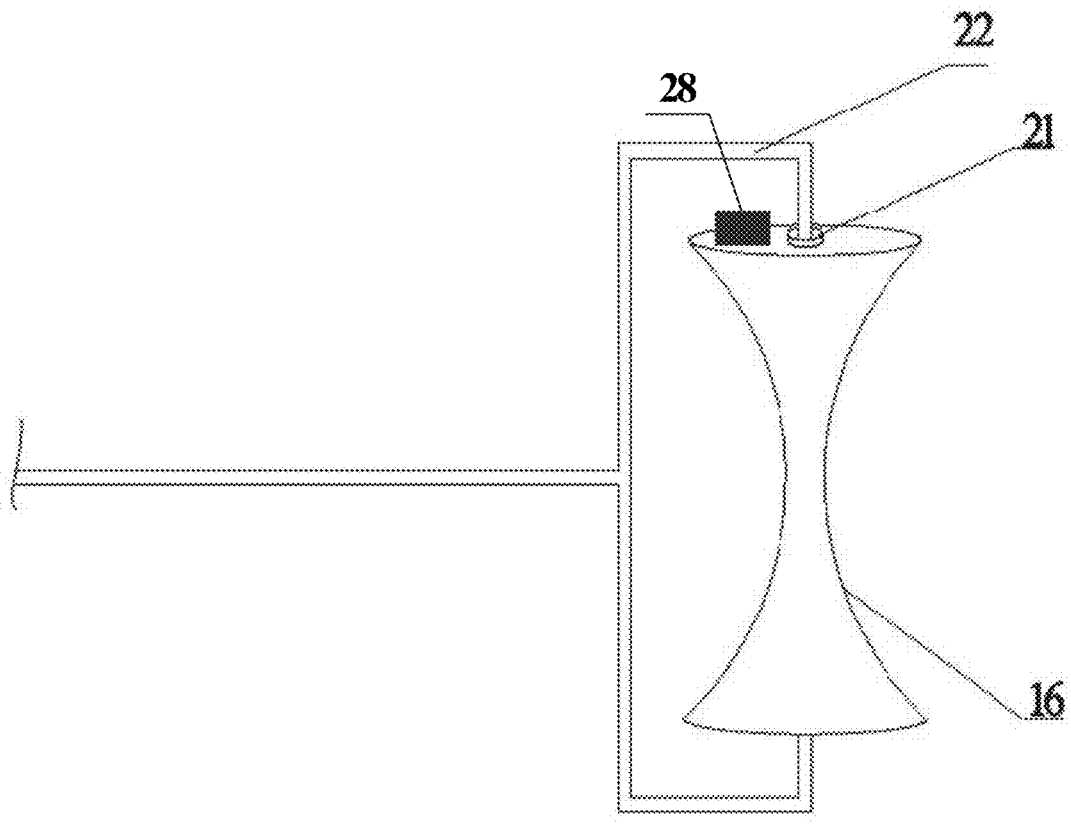
FIG. 7 is an alternative schematic diagram of an installation of the traction roller of the pulling tube system of the preparation device for the medium borosilicate medicinal glass tube according to some embodiments of the present disclosure.

FIG. 7 is an alternative schematic diagram of an installation of the traction roller of the pulling tube system of the preparation device for the medium borosilicate medicinal glass tube according to some embodiments of the present disclosure.

In some embodiments, the preparation device further incudes at least one damping device 28, as shown in FIG. 7.

In some embodiments, the at least one damping device 28 is located on at least one traction roller, and the at least one damping device is configured to control following strength of the at least one the traction roller based on a damping parameter. One damping device 28 may be disposed on one traction roller. One or more traction rollers may be equipped with one or more damping devices 28 according to actual needs. The damping device may include a smart material damping device, an electromagnetic damper, or the like. The electromagnetic damper may utilize electromagnetic induction to generate a damping force to control the following strength of the traction roller. The smart material damping device is a damper made of smart material. The smart material may include shape memory alloys or electrorheological fluids, or the like. The smart material damping device may control the following strength of the traction roller using the damping force generated by the change of the characteristics of the smart material with the external stimulation (e.g., temperature or electric field).

The damping parameter is a parameter used to regulate the following strength of the traction roller by the damping device. For example, the damping parameter may be a power of an electromagnetic damper, a current or temperature of a smart material damping device, or the like.

In some embodiments, the remote processor is further configured to obtain a glass tube diameter within a preset time period through an online inspection system; obtain the molten glass feature within the preset time period through the detection device; obtain the overflow liquid distribution data within the preset time period through the level measuring device; and determine the damping parameter based on the glass tube diameter, the overflow liquid distribution data, and the molten glass feature. The preset time period may be preset by a person skilled in the art based on experience.

In some embodiments, the remote processor may determine a mean and a variance of the glass tube diameter within the preset time period based on the glass tube diameter within the preset time period; and determine a first candidate damping parameter based on the mean and the variance of the glass tube diameter, and the tube diameter threshold. The tube diameter threshold is a critical value of the glass tube diameter. The tube diameter threshold may be preset by the person skilled in the art based on experience.

As an example only, in response to the variance of the glass tube diameter being less than the tube diameter threshold, and the mean of the glass tube diameter is smaller, the remote processor may reduce the initial damping parameter according to a first adjustment value to obtain the first candidate damping parameter. The initial damping parameter may be preset by a person skilled in the art based on historical data. The first adjustment value may include a power adjustment value, a current adjustment value, or a temperature adjustment value, or the like. The first adjustment value may be preset by a person skilled in the art based on experience. For example, the smaller the mean of the glass tube diameter, the larger the first adjustment value may be preset.

Understandably, the glass tube diameter is mainly determined by a pulling speed of the traction roller. The glass tube with large diameter depends on a slow pulling speed of the traction roller to form a uniform tube wall thickness. At this time, the traction roller with a slow traction speed has a weak following strength, and the damping parameter may be appropriately reduced to make the pulling process of the traction roller smooth.

In some embodiments, the remote processor may further determine a variance of the overflow liquid distribution data within the preset time period based on the overflow liquid distribution data within the preset time period; and determine a second candidate damping parameter based on the variance of the overflow liquid distribution data.

As an example only, in response to the variance of the overflow liquid distribution data within the preset time period being larger, the remote processor may appropriately increase the initial damping parameter in accordance with a second adjustment value to obtain a second candidate damping parameter. The second adjustment value may include a power adjustment value, a current adjustment value, or a temperature adjustment value, or the like. The second adjustment value may be preset by the person skilled in the art based on experience. For example, the greater the variance of the overflow liquid distribution data, the greater the second adjustment value may be preset.

Understandably, if the molten glass overflows excessively at a certain position of the annular seam, it may cause uneven traction, resulting in abnormal rotation or overload of the traction rollers. At this time, the following strength of the traction rollers are very strong, and the damping parameter needs to be increased to prevent an accidental occurrence of the traction rollers.

In some embodiments, the remote processor may also determine a variance of the molten glass feature within the preset time period based on the molten glass feature within the preset time period; and determine a third candidate damping parameter based on the variance of the molten glass feature. The variance of the molten glass feature within the preset time period may be a variance of the molten glass viscosity at a plurality of preset time points within the preset time period. The plurality of preset time points may be preset empirically by a person skilled in the art.

As an example only, in response to the variance of the molten glass feature being greater (equivalent to a greater change in the molten glass viscosity), the remote processor may appropriately increase the initial damping parameter in accordance with a third adjustment value to obtain a third candidate damping parameter. The third adjustment value may include a power adjustment value, a current adjustment value, or a temperature adjustment value, or the like. The third adjustment value may be preset by the person skilled in the art based on experience. For example, the greater the variance of the molten glass feature, the greater the third adjustment value may be preset.

Understandably, the high viscosity of the molten glass may affect the integrity of the glass tube and its friction characteristics on the traction rollers, making the traction process of the traction rollers more challenging, and requiring the traction rollers to have a strong traction force. If the molten glass viscosity changes greatly, it indicates that the molten glass is unstable and prone to accidents. The following strength change of the traction rollers caused by the change of the molten glass feature is large. At this time, by increasing the damping parameter of the damping device, it can effectively prevent changes in the following strength of the traction roller caused by the friction, so as to ensure that the quality of the glass product is stable.

In some embodiments, the remote processor may determine a weighted sum of the first candidate damping parameter, the second candidate damping parameter, and the third candidate damping parameter as a final damping parameter. Weighting coefficients of the first candidate damping parameter, the second candidate damping parameter, and the third candidate damping parameter may be preset by a person skilled in the art according to practical needs.

In some embodiments, the remote processor may also determine a mean of the first candidate damping parameter, the second candidate damping parameter, and the third candidate damping parameter as the final damping parameter.

For more description of the overflow liquid distribution data and the molten glass feature, please see FIG. 6 and its related descriptions.

In some embodiments, the remote processor may also determine candidate damping parameters; determine a forming quality coefficient of the glass tube corresponding to the candidate damping parameters by a second prediction model based on the candidate damping parameters, the glass tube diameter, the overflow liquid distribution data, the molten glass feature, and the speed adjustment parameter; and determine the damping parameter based on the forming quality coefficient.

The candidate damping parameter is a damping parameter to be determined.

In some implementations, the remote processor may determine the historical damping parameter with the top N of usage frequency in the historical data as candidate damping parameters. The value of N is related to a prediction accuracy of the second prediction model, and N is a positive integer. For example, if it is desired to have a high accuracy of the forming quality coefficients of the glass tubes corresponding to the candidate damping parameters predicted by the trained second prediction model, the value of N may be increased moderately.

For more descriptions about the speed adjustment parameters and the forming quality coefficient, please see FIG. 6 and its related descriptions.

In some embodiments, the second prediction model may be a machine learning model. For example, the second prediction model may include Neural Network (NN) model or Deep Neural Network (DNN) model, etc.

In some embodiments, the second prediction model may be obtained by training based on a large number of third training samples with third labels. The third training samples may include a historical sample damping parameter, a historical sample glass tube diameter, a historical sample overflow liquid distribution data, a historical sample molten glass feature, and a historical sample speed adjustment parameter. The third labels may include a forming quality coefficient of the historical sample glass tube. The third training samples may be obtained from the historical data; the third labels are obtained in a manner similar to the first labels of the first prediction model, please see the description of the first prediction model.

In some embodiments, the training process of the second prediction model is similar to the training process of the uniformity value prediction model, please see the description of the training process of the uniformity value prediction model in the FIG. 6.

In some embodiments, the remote processor may determine the damping parameter based on the forming quality coefficient of the glass tube in multiple ways. For example, the remote processor may select the candidate damping parameter with the largest forming quality coefficient among the plurality of candidate damping parameters as the damping parameter.

In one or more embodiments of present disclosure, the remote processor also considers the speed adjustment parameter of the molten glass in the process of determining the speed adjustment parameter of the glass tube through the second prediction model, so as to consider the influence of overflow of the molten glass on the friction force of the traction rollers, further improving the accuracy of the predicted forming quality coefficient of the glass tube. The remote processor can better screen suitable damping parameters to control the following strength of the traction rollers and improve the forming quality of the glass tube.

In one or more embodiments of the present disclosure, by adding an adjustable damping device on the traction roller, the following strength of the traction roller can be controlled, so as to control the quality of the final formed glass tube and improve the forming quality of the glass tube.

In some embodiments, heating devices are arranged on the outsides of the muffle furnace, the shaping furnace, and the upper portion of the annealing furnace. The heating devices are also configured to heat based on temperature parameters. The servo motor is further configured to operate based on motor parameters. For more description of the muffle furnace, the shaping furnace, the annealing furnace, and the servo motor, please see the related description of FIG. 1.

The temperature parameter is a parameter related to the operating temperature of the heating device. For example, the temperature parameter may include a heating power of the heating device, or the like.

In some embodiments, the remote processor is further configured to obtain a temperature of the muffle furnace, a temperature of the shaping furnace, and a temperature of the annealing furnace from the temperature measuring devices; determine a temperature drop gradient based on the temperature of the muffle furnace, the temperature of the shaping furnace, and the temperature of the annealing furnace; and determine the temperature parameter and/or the motor parameter based on the temperature drop gradient and the speed adjustment parameter. The remote processor may control operation of the heating device based on the temperature parameter; and control operation of the servo motor based on the motor parameter, ensuring that the internal stress of the produced glass tube is fully relieved and the forming quality of the glass tube is improved.

The motor parameter refers to a parameter used to adjust the operation of a servo motor. For example, the motor parameter may include a rated power, a rated speed, or the like.

In some embodiments, the temperature drop gradient may include a muffle furnace-shaping furnace temperature gradient and a shaping furnace-annealing furnace temperature gradient.

The muffle furnace-shaping furnace temperature gradient may be characterized by a ratio of the difference between the temperature of the shaping furnace and the temperature of the muffle furnace to the temperature of the muffle furnace.

The shaping furnace-annealing furnace temperature gradient may be characterized by a ratio of the difference between the temperature of the annealing furnace and the temperature of the shaping furnace to the temperature of the shaping furnace.

In some embodiments, the remote processor may obtain the temperature of the muffle furnace, the temperature of the shaping furnace, and the temperature of the annealing furnace, and obtain the muffle furnace-shaping furnace temperature gradient and the shaping furnace-annealing furnace temperature gradient by calculating.

In some embodiments, the remote processor may determine the temperature parameter and/or the motor parameter based on the temperature drop gradient and the speed adjustment parameter in a variety of ways.

In some embodiments, the remote processor determines a second target feature vector based on the temperature drop gradient; determines a second correlation feature vector based on the second target feature vector via a second vector database; determines a reference temperature parameter and/or a reference motor parameter corresponding to the second correlation feature vector as an initial temperature parameter and/or a motor parameter; and determines the temperature parameter based on the initial temperature parameter and the speed adjustment parameter.

The second vector database includes a plurality of second reference feature vectors, each of the plurality of second reference feature vectors has a corresponding reference temperature parameter and/or a reference motor parameter. In some implementations, the remote processor constructs the second reference feature vectors based on historical temperature drop gradient, historical temperature parameter, and/or historical motor parameter corresponding to the glass tubes with good production quality in historical data. For the method of determining the glass tubes with good production quality, please see the related description of the first vector database.

In some embodiments, the remote processor may determine, based on the second target feature vector, a second reference feature vector that meets the second target preset condition in the second vector database, and determine the second reference feature vector that meets the second target preset condition as a second correlation feature vector. In some embodiments, the second target preset condition may include that a vector distance from the second target feature vector is minimum, or the like.

In some embodiments, in response to the opening diameter of the automatic adjusting gate in the speed adjustment parameter being larger, indicating that the flow rate of the molten glass is larger, and the temperature of the molten glass is less likely to be lost, the remote processor may appropriately reduce the initial temperature parameter in accordance with a set adjustment temperature value to obtain a final temperature parameter of the heating device, and the initial temperature parameter is obtained from the second vector database. The set adjustment temperature value may be preset by a person skilled in the art based on experience.

In one or more embodiments of the present disclosure, the servo motor and the heating device are controlled to operate by determining the appropriate temperature parameter and/or the motor parameter based on a temperature drop gradient and a speed adjustment parameter, which ensures that the internal stresses in the produced glass tubes are fully relieved and the forming quality of the glass tubes is improved.

The basic concepts have been described above, and it is apparent to those skilled in the art that the foregoing detailed disclosure serves only as an example and does not constitute a limitation of the present disclosure. While not expressly stated herein, various modifications, improvements, and amendments may be made to this disclosure by those skilled in the art. Those types of modifications, improvements, and amendments are suggested in this disclosure, so those types of modifications, improvements, and amendments remain within the spirit and scope of the exemplary embodiments of this disclosure.

At the same time, the disclosure uses specific words to describe embodiments of the disclosure. For example, "an embodiment", "one embodiment", and/or "some embodiments" means a feature, structure, or characteristic associated with at least one embodiment of the present disclosure. Therefore, it is emphasized and should be appreciated that two or more references to "an embodiment" or "one embodiment" or "an alternative embodiment" in various portions of the present disclosure are not necessarily all referring to the same embodiment. In addition, some features, structures, or characteristics of one or more embodiments in the present disclosure may be properly combined.

Furthermore, the recited order of processing elements or sequences, or the use of numbers, letters, or other designation therefore, is not intended to limit the claimed processes and methods to any order except as may be specified in the claims. Although the above disclosure discusses some embodiments of the invention currently considered useful by various examples, it should be understood that such details are for illustrative purposes only, and the additional claims are not limited to the disclosed embodiments. Instead, the claims are intended to cover all combinations of corrections and equivalents consistent with the substance and scope of the embodiments of the invention. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that object of the present disclosure requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate" or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes. History application documents that are inconsistent or conflictive with the contents of the present disclosure are excluded, as well as documents (currently or subsequently appended to the present specification) limiting the broadest scope of the claims of the present disclosure. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A preparation device for a medium borosilicate medicinal glass tube, comprising:

a melting system, wherein the melting system includes a melting zone and a clarification zone disposed in sequence; the melting zone is configured to melt batch material into molten glass and feed the molten glass into the clarification zone, and the clarification zone is configured to perform bubble homogenization and stirring deaeration on the molten glass, and feed the molten glass into a feeder of a forming system through a feed pipe;

the forming system, wherein the forming system includes a muffle furnace, a shaping furnace, and an annealing furnace arranged in sequence; wherein the muffle furnace includes the feeder, the feeder is in a shape of an inverted truncated cone, a guide pipe is arranged below the feeder, the guide pipe extends to a lower end of the shaping furnace from the muffle furnace, a furnace channel is disposed outside the feeder and the guide pipe inside the muffle furnace, the furnace channel is coaxially with the feeder and the guide pipe to form an annular seam; at least one set of traction rollers and at least one guide clamping ring are provided in the shaping furnace, the at least one set of traction rollers and the at least one guide clamping ring are configured to clamp and position glass melt, and the at least one set of traction rollers are arranged on a gripping drive bracket, the gripping drive bracket and the at least one guide clamping ring are arranged on a wall of the shaping furnace and connected to an external servo motor; and at least one set of traction rollers and at least one guide clamping ring are provided on an upper part of the annealing furnace; and a cutting system that cuts a formed and annealed glass tube according to a preset size, wherein the cutting system is disposed below the forming system, wherein a side of each of the at least one set of traction rollers is a rotational surface, a plurality of traction rollers are one set of traction rollers which are set at a same horizontal level in the shaping furnace, and generatrices of the rotational surfaces of the traction rollers form an annulus wrapping the glass tube.

2. The preparation device of claim 1, further comprising an online inspection system that monitors and provides feedback on glass tube diameter and glass tube condition, wherein the online inspection system is placed at an outlet of the annealing furnace.

3. The preparation device of claim 1, wherein heating devices are arranged on outsides of the muffle furnace, the shaping furnace, and the upper part of the annealing furnace; temperature measuring devices are arranged on the outsides of the muffle furnace and the shaping furnace, and the temperature measuring devices are arranged on the outside of the annealing furnace according to a temperature gradient inside the annealing furnace.

4. The preparation device of claim 1, wherein a depth of an inner bucket of the feeder is not less than ½ of a total height of the feeder and not greater than the total height of the feeder.

5. The preparation device of claim 1, wherein positioning wheels are arranged at both ends of each traction roller.

6. The preparation device of claim 1, wherein a minimum diameter of the furnace channel is 2 mm-30 mm greater than a bottom diameter of the feeder.

7. The preparation device of claim 1, wherein the melting zone includes a melting furnace and heating electrodes, a flue is arranged at an upper part of a front wall of the melting furnace, and a feeding port is arranged at a lower part of the front wall of the melting furnace; the heating electrodes are arranged in a stacked configuration along a side of a pool wall, burners are arranged on both sides of a breastwall of the melting furnace, and a discharge port is arranged at a bottom of the melting furnace.

8. The preparation device of claim 7, wherein the clarification zone includes a clarification channel and a homogenization tank, the clarification channel is connected with the melting furnace and the homogenization tank, the homogenization tank is provided with a stirring device, a bottom bubbling device that bubbles into the molten glass to promote clarification of the molten glass, and an outlet port, the stirring device is configured to homogenize the molten glass, and the outlet port is arranged at a bottom of the homogenization tank.

9. The preparation device of claim 1, further comprising an automatic adjusting gate, a level measuring device, a remote processor, a monitoring device, and a detection device; wherein the automatic adjusting gate is disposed on the feed pipe, and the automatic adjusting gate is configured to regulate a flow rate of the molten glass fed into the muffle furnace via the feed pipe based on a speed adjustment parameter of the molten glass;

the level measuring device is disposed above the furnace channel, and the level measuring device is configured to measure overflow liquid distribution data of the molten glass overflowing from a circular top of the feeder;

the monitoring device is disposed on the feed pipe between the clarification zone and the automatic adjusting gate, and the monitoring device is configured to monitor a discharge rate of the clarification zone;

the detection device is disposed above the furnace channel, and the detection device is configured to detect a molten glass feature at the annular seam; and the remote processor is configured to:

determine the speed adjustment parameter based on the discharge rate, the molten glass feature, and the overflow liquid distribution data.

10. The preparation device of claim 9, wherein the remote processor is further configured to:

determine a flow uniformity value of the molten glass based on the overflow liquid distribution data and the molten glass feature; and determine the speed adjustment parameter based on the flow uniformity value and the discharge rate.

11. The preparation device of claim 10, wherein the remote processor is further configured to:

obtain a glass tube diameter through an online inspection system; and determine the flow uniformity value of the molten glass by a uniformity value prediction model based on the glass tube diameter, the overflow liquid distribution data, and the molten glass feature; the uniformity value prediction model being a machine learning model.

12. The preparation device of claim 10, wherein the remote processor is further configured to:

determine a flow rate of the molten glass based on the discharge rate;

determine a forming quality coefficient of the glass tube corresponding to a candidate adjustment parameter through a first prediction model based on the candidate adjustment parameter, the flow rate of the molten glass, and the flow uniformity value, the first prediction model being a machine learning model; and determine the speed adjustment parameter based on the forming quality coefficient.

13. The preparation device of claim 9, further comprising at least one damping device; wherein the at least one damping device is located on at least one of the traction rollers, and the at least one damping device is configured to control following strength of the at least one of the traction rollers based on a damping parameter;

the remote processor is further configured to:

obtain a glass tube diameter within a preset time period through an online inspection system;

obtain the molten glass feature within the preset time period through the detection device;

obtain the overflow liquid distribution data within the preset time period through the level measuring device; and determine the damping parameter based on the glass tube diameter, the overflow liquid distribution data, and the molten glass feature.

14. The preparation device of claim 13, wherein the remote processor is further configured to:

determine candidate damping parameters;

determine a forming quality coefficient of the glass tube corresponding to the candidate damping parameters by a second prediction model based on the candidate damping parameters, the glass tube diameter, the overflow liquid distribution data, the molten glass feature, and the speed adjustment parameter, the second prediction model being a machine learning model; and determine the damping parameter based on the forming quality coefficient.

15. The preparation device of claim 9, wherein heating devices are arranged on outsides of the muffle furnace, the shaping furnace, and an upper part of the annealing furnace, temperature measuring devices are arranged on the outsides of the muffle furnace and the shaping furnace, and the heating devices are further configured to heat based on a temperature parameter;

the servo motor is further configured to operate based on a motor parameter;

the remote processor is further configured to:

obtain a temperature of the muffle furnace, a temperature of the shaping furnace, and a temperature of the annealing furnace from the temperature measuring devices;

determine a temperature drop gradient based on the temperature of the muffle furnace, the temperature of the shaping furnace, and the temperature of the annealing furnace; and determine the temperature parameter and/or the motor parameter based on the temperature drop gradient and the speed adjustment parameter.

16. A method for preparing a medium borosilicate glass tube using the preparation device of claim 1, comprising:

putting the batch material into the melting furnace for high temperature glass melting to obtain a first molten glass, the first molten glass having a melt viscosity within a range of $10^2$ dPa·s-$10^{2.3}$ dPa·s;

feeding the first molten glass to a homogenization tank for glass clarification and deaeration homogenization to obtain a second molten glass, the second molten glass having a clarification homogenization viscosity within a range of $10^{2.5}$ dPa·s-$10^3$ dPa·s;

feeding the second molten glass into the muffle furnace through the feed pipe, waiting for the second molten glass in the feeder to be full, overflowing from a circular top of the feeder at the same time, and along an outer edge of the feeder, the second molten glass flowing uniformly downward through an annular seam formed by the furnace channel and the feeder, an opening diameter of the second molten glass gradually decreasing and the second molten glass entering the shaping furnace; clamping the molten glass by the at least one set of traction rollers and the at least one guide clamping ring, under a uniform tension of the traction rollers and a gravity of the molten glass, drawing the molten glass into a hollow slender glass tube with a uniform thickness along a pulling tube system; the hollow slender glass tube having a forming and drawing viscosity within a range of $10^4$ dPa·s-$10^{4.3}$ dPa·s;

feeding the hollow slender glass tube into the annealing furnace for annealing to relieve stress of the hollow slender glass tube, the hollow slender glass tube having a stress-relief viscosity of not less than $10^9$ dPa·s; and feeding the annealed hollow slender glass tube into the cutting device for cutting according to a preset size and completing inspection and packaging.

\* \* \* \* \*